US005730682A

United States Patent [19]
Depping et al.

[11] Patent Number: 5,730,682
[45] Date of Patent: Mar. 24, 1998

[54] METHOD OF OPERATION OF A DRIVE UNIT AND DEVICE FOR EXECUTION OF THE METHOD

[75] Inventors: Herbert Depping, Giengen; Friedrich Häberle; Wilfried Maier, both of Heidenheim; Erwin Rotter, Nattheim; Volker Schempp, Weilheim, all of Germany

[73] Assignee: Voith Turbo GmbH, Heidenheim, Germany

[21] Appl. No.: 644,540

[22] Filed: May 10, 1996

[30] Foreign Application Priority Data

May 11, 1995 [DE] Germany ............... 195 16 948.4

[51] Int. Cl.$^6$ ............................................ F16H 61/02
[52] U.S. Cl. ............................................ 477/120
[58] Field of Search ................... 475/123, 125; 477/120, 904

[56] References Cited

U.S. PATENT DOCUMENTS

| | | | |
|---|---|---|---|
| 5,315,514 | 5/1994 | Steeby et al. | 364/424.1 |
| 5,484,350 | 1/1996 | Ishikawa et al. | 477/120 |
| 5,515,272 | 5/1996 | Sakai et al. | 477/120 |
| 5,531,654 | 7/1996 | Ishikawa et al. | 477/120 |
| 5,555,170 | 9/1996 | Nakashima | 477/120 |

FOREIGN PATENT DOCUMENTS

| | | |
|---|---|---|
| 0 352 551 | 1/1990 | European Pat. Off. . |
| 0 417 275 | 3/1991 | European Pat. Off. . |
| 38 27 091 | 3/1989 | Germany . |

OTHER PUBLICATIONS

European Search Report on European Patent Application No. 96 10 5976.3, dated Jun. 4, 1997.

*Primary Examiner*—Dirk Wright
*Attorney, Agent, or Firm*—Marshall, O'Toole, Gerstein, Murray & Borun

[57] ABSTRACT

The invention concerns a method for operation of a drive unit of a vehicle, including a drive machine and a transmission with at least two gears. A quantity that characterizes acceleration of the vehicle and a quantity that characterizes the power of the drive engine are continuously determined. A gear shift speed range and a second speed range bounded by a lowest and highest attainable speed in the target gear can be established for a gear shift process in the initial gear. The gear shift speed range is bounded at least by a lower gear shift speed and an upper gear shift speed and the second speed range is bounded by a lower target speed, as well as an additional speed. The gear shift process is initiated as a function of the determined acceleration. The lower target speed is achieved in a gear shift process in a first limiting stage (high acceleration at low input speeds or limited deceleration at low input speeds) during initiation of a gear shift at a number of gear shift speeds. The gear shift process between the first limiting state and the highest attainable speed in the target gear is initiated as a function of the determined quantities in the gear shift speed range in the initial gear.

15 Claims, 10 Drawing Sheets

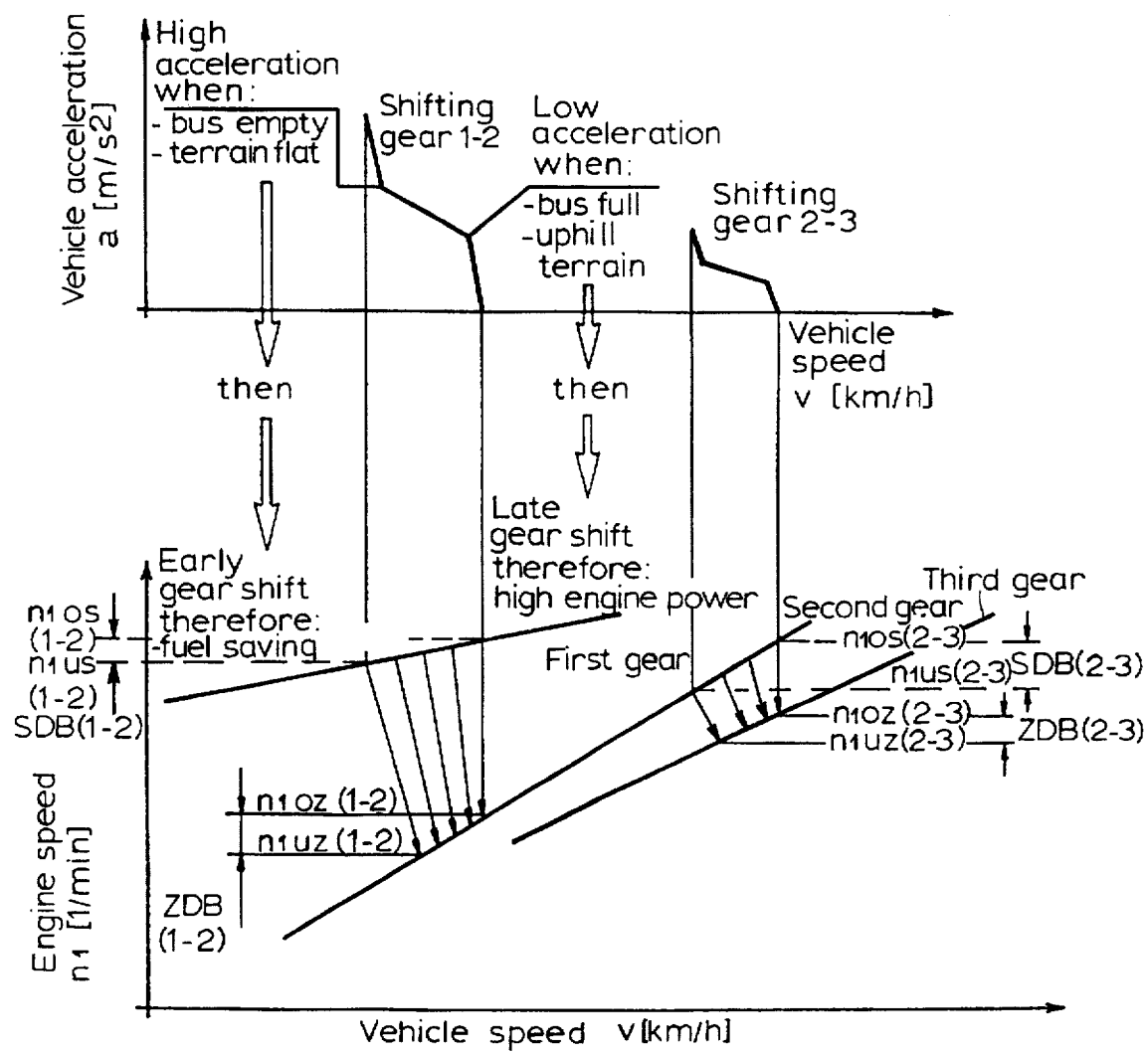

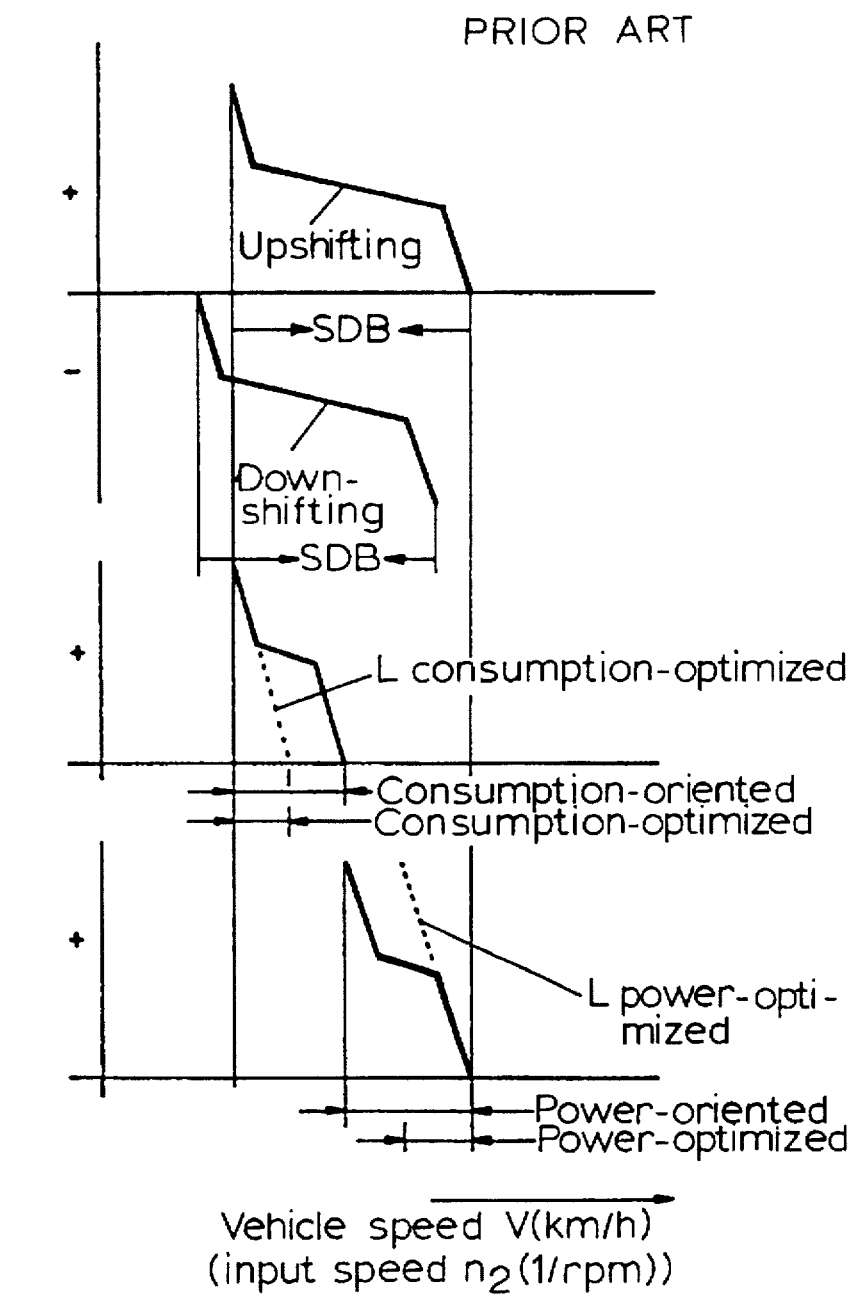

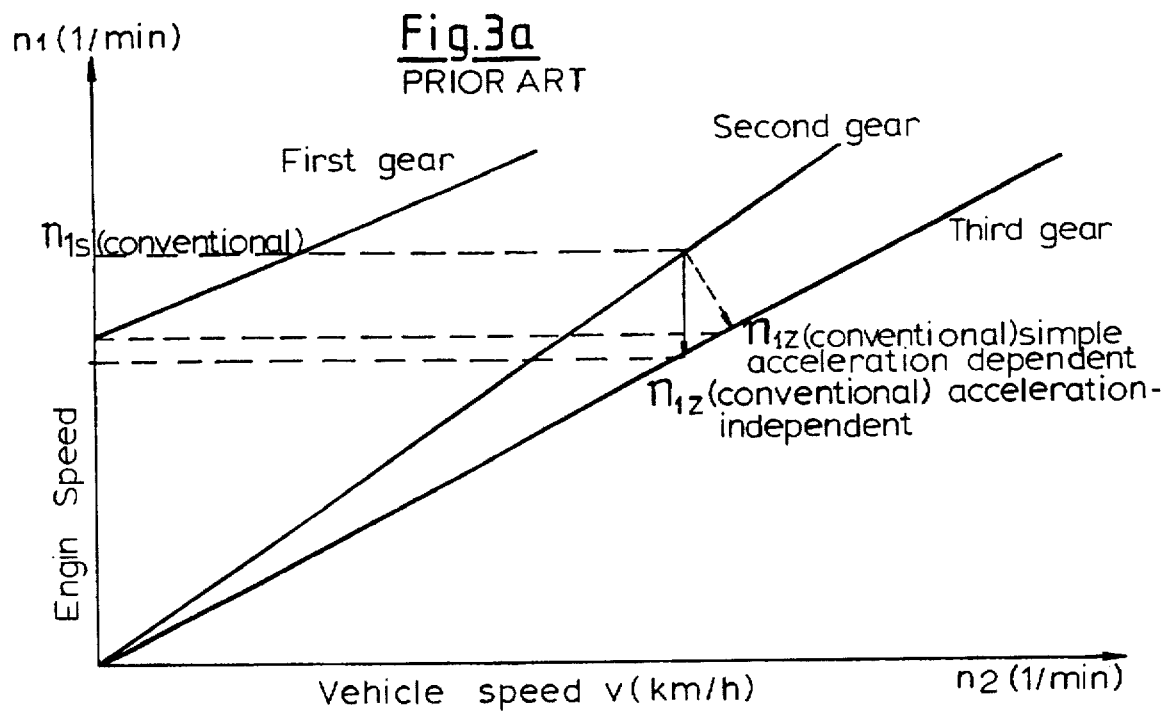
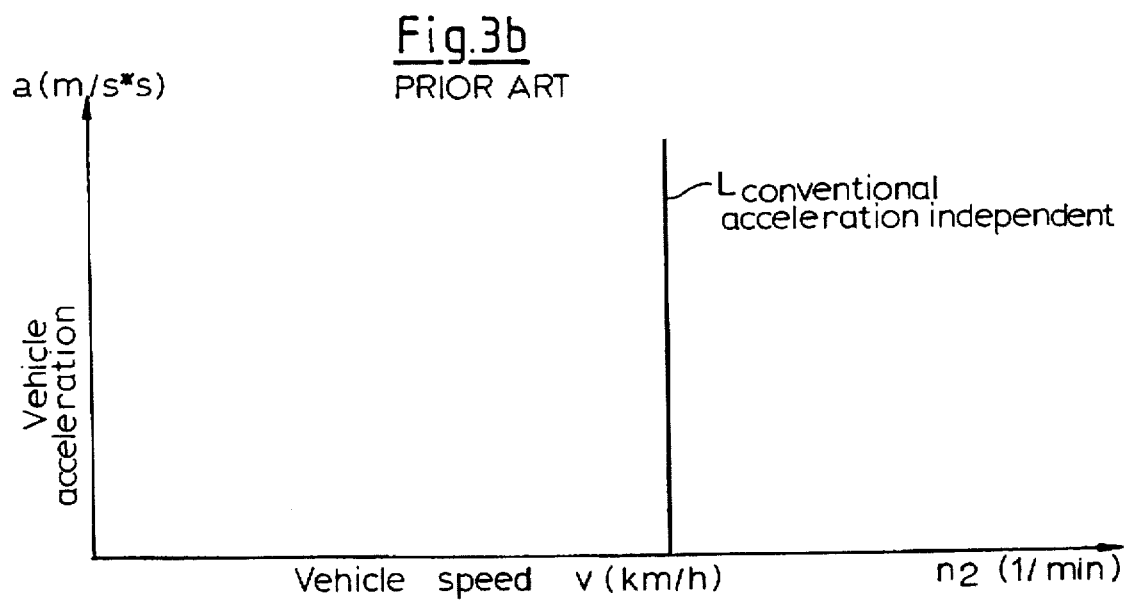

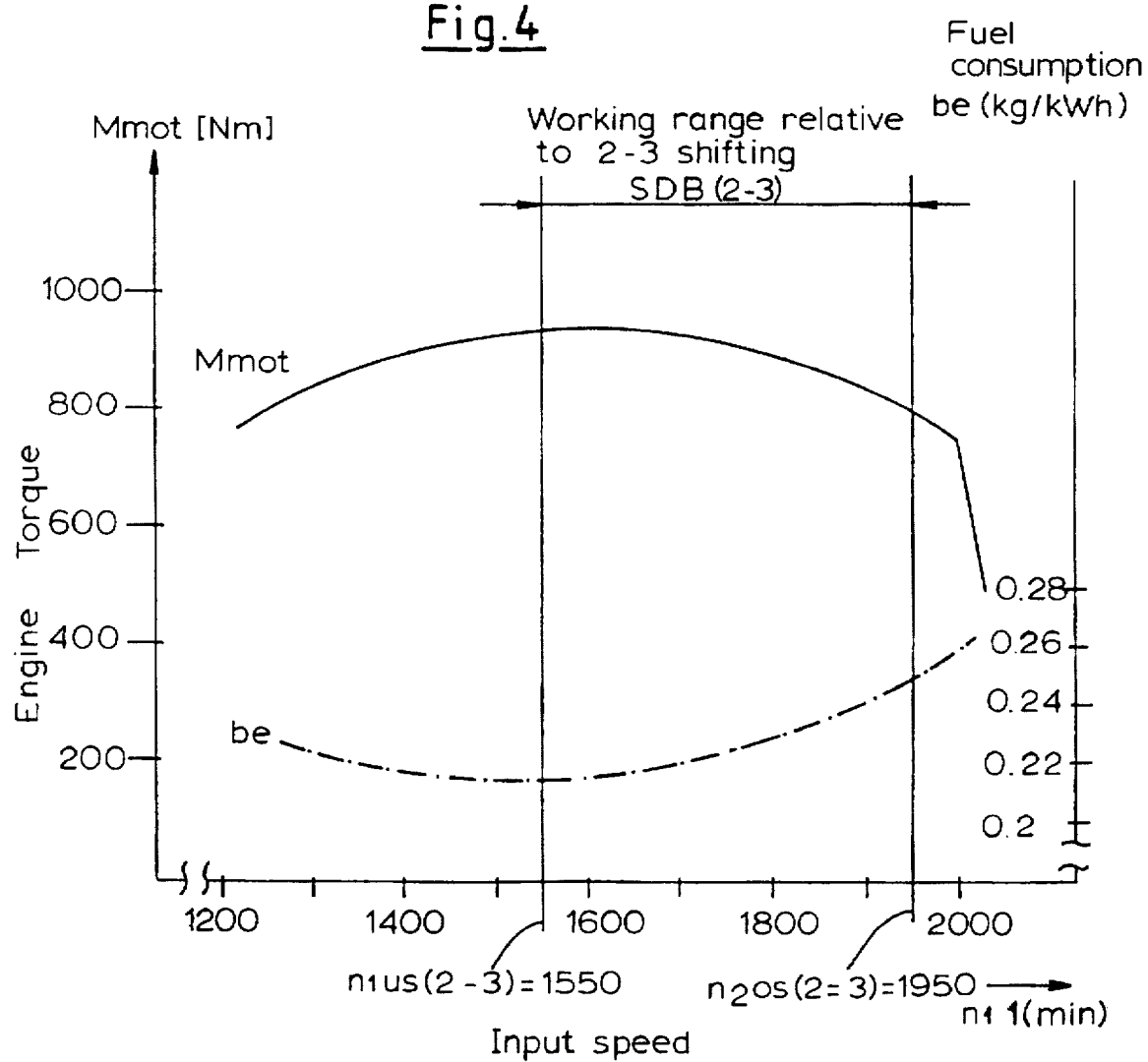

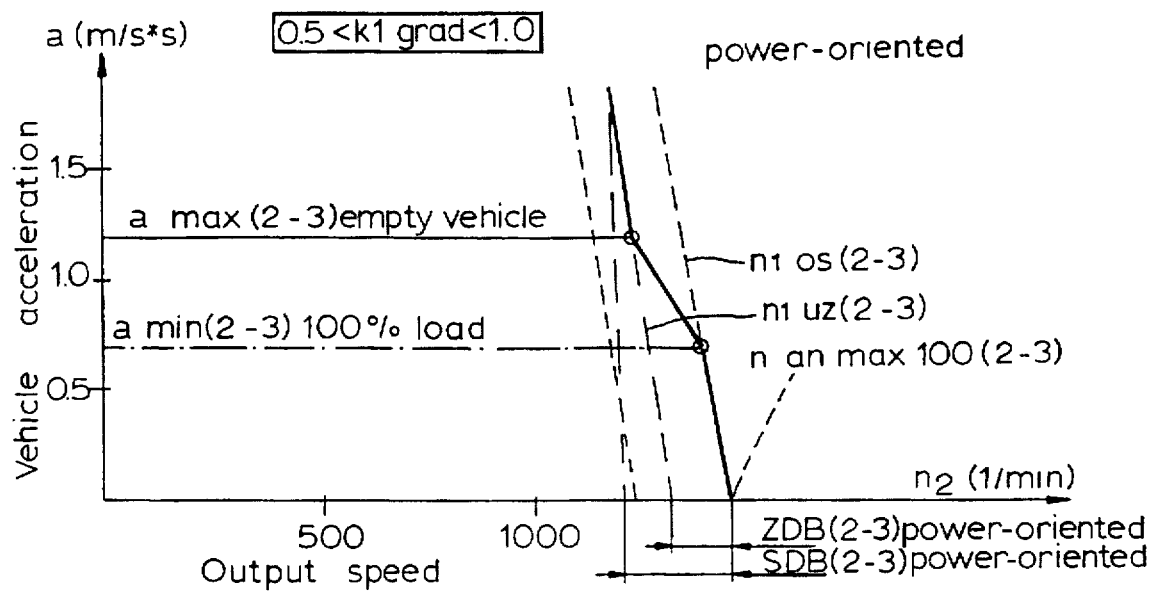
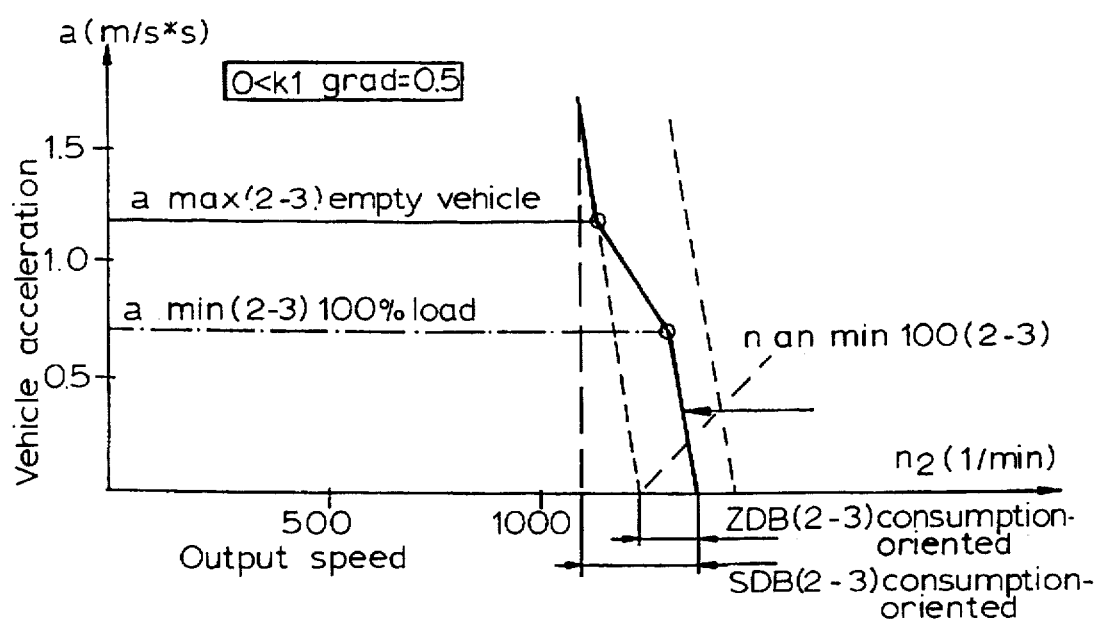

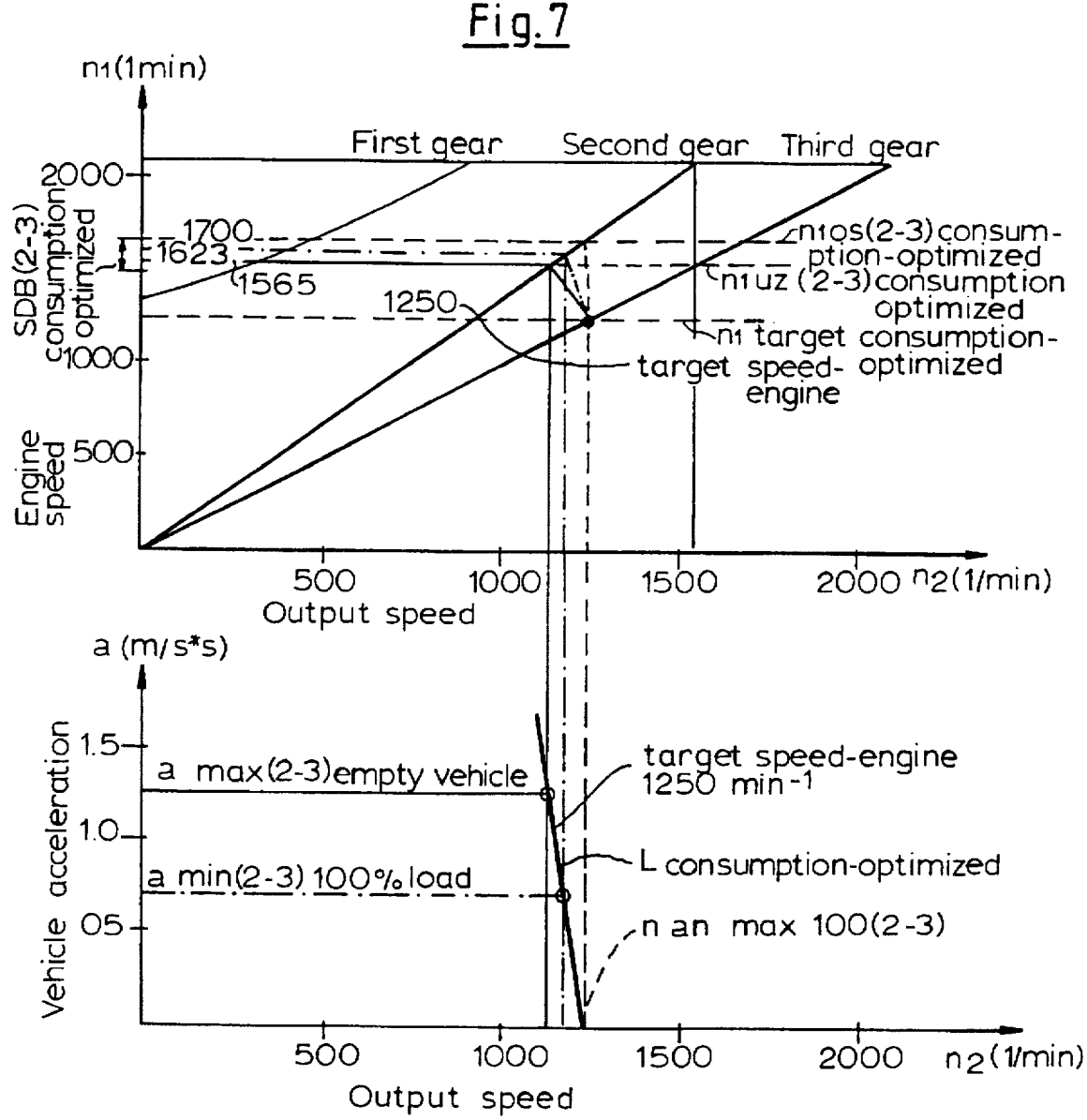

METHOD OF OPERATION OF A DRIVE UNIT AND DEVICE FOR EXECUTION OF THE METHOD

BACKGROUND OF THE INVENTION

1. Field of the Invention

The invention concerns methods for operating a drive unit, such as a drive unit of a vehicle having a drive engine and a transmission with at least two gears, and a device for execution of such methods.

2. Description of the Invention

Gear shift programs with fixed gear shift points or simple acceleration-dependent gear shift programs have thus far been known in drive trains, especially in drive trains with automatic transmissions, which are used in combination with connected mechanical working points according to the principle of a torque converter with external torque division. The full-load gear shift normally occurs in the former in the upper speed range of the engine $n_1$. The upshifts decisive for the fuel therefore occur at about 80% to 90% of the engine's nominal speed. The higher engine power is thus utilized for better vehicle acceleration, which can be essential in hilly terrain or with high occupancy of a vehicle, especially a bus. However, higher fuel consumption also occurs because the engine operates in a more unfavorable performance range at higher speeds (see engine performance: consumption as a function of load and speed). During braking, i.e., with the gear engaged and the accelerator set at zero, the engine speed has no effect on fuel consumption, since fuel feed is disconnected. To avoid vibration between gears, downshifts generally lie at lower speeds than the upshifts, except during kickdown. The gear shift programs with fixed gear shift points are also laid out so that for partial load, or without load, certain gear shift points also are stipulated at lower engine speeds than during full load.

A so-called overstep or kickdown function can additionally be prescribed, which offers the opportunity to extend the gears up to the highest admissible engine speed. Such gear shift programs with fixed gear shift points operate either very power-oriented (and are therefore characterized by increased fuel consumption) or are very consumption-oriented.

SUMMARY OF THE INVENTION

It is an object of the invention to overcome one or more of the problems described above. It also is an object of the invention to modify a method for operation of a drive unit and a device for execution of the method so that improved engine-transmission management can be achieved with the objective of increased comfort and better acceleration and deceleration behavior for reasons of safety in all driving conditions, as well as a reduction of fuel consumption with a view toward environmental protection.

According to the invention, a method of operation of a drive unit of a vehicle having a drive engine and a transmission with at least two gears includes the step of continuously determining the following quantities: (i) a quantity characterizing acceleration of the vehicle; and (ii) quantities characterizing the power of the drive engine. The method also includes establishing for a gear shift process in an initial gear, a gear shifting speed range and a second speed range bounded by a lowest and highest achievable speed of a target gear, the gear shift speed range being bounded at least by a lower gear shift speed and an upper gear shift speed, the second speed range being bounded by a lower target speed and an additional speed. The gear shift process is initiated as a function of a determined acceleration. The lower target speed during a shifting process in a first limiting state (high acceleration at low input speeds or limited deceleration at low input speeds) is achieved during introduction of shifting at a number of gear shift speeds. The gear shift process is introduced between the first limiting state and the highest attainable speed in the target gear as a function of the determined quantities in the gear shift speed range in the initial gear.

A vehicle drive unit according to the invention includes a drive engine, a transmission having at least two gears, and a control device connected to the transmission having a control unit having at least first, second, and third inputs and at least one output. The first input is connected to a measurement device for determining a quantity that describes acceleration of the vehicle. The second input is connected to a device for determining torque of the drive engine. The third input is connected to a device for determining the speed of the drive engine. The output is connected to a control unit to accomplish a gear shift process in the transmission. The unit further includes apparatus for storing at least one characteristic curve in the control unit for a gear shift speed range to characterize the relation between present acceleration, input speed, drive torque and gear shift speed and apparatus for forming control quantities from the input quantities.

Other objects and advantages of the invention will be apparent to those skilled in the art from the following detailed description taken in conjunction with the drawings and the appended claims.

BRIEF DESCRIPTION OF THE DRAWINGS

FIG. 1 is a two-part diagram showing Vehicle Acceleration (a) vs. Vehicle Speed (v) in the upper diagram and Engine or Input Speed ($n_1$) vs. Vehicle Speed (v) in the lower diagram of an acceleration-dependent gear shift program according to the invention.

FIG. 2a is a diagram showing Vehicle Acceleration (a) vs. Vehicle Speed (v) for an acceleration-dependent gear shift method of the prior art.

FIG. 2b a diagram showing Vehicle Acceleration (a) vs. Vehicle Speed (v) for a consumption-oriented, acceleration-dependent gear shift method of the invention.

FIG. 2c a diagram showing Vehicle Acceleration (a) vs. Vehicle Speed (v) for a power-oriented, acceleration-dependent gear shift method of the invention.

FIG. 3a is a diagram showing Engine or Input Speed ($n_1$) vs. Vehicle Speed (v) (which is proportional to output speed $n_2$) for a gear shifting method of the prior art having fixed gear shift points.

FIG. 3b is a diagram showing Vehicle Acceleration (a) vs. Vehicle Speed (v) according to the method shown in FIG. 3a.

FIG. 4 is a diagram showing Engine Torque ($M_{mot}$) vs. Input Speed ($n_1$) and Fuel Consumption (be) vs. Input Speed ($n_1$) for a method according to the invention.

FIG. 6a is a diagram showing Vehicle Acceleration (a) vs. Output Speed ($n_2$) illustrating an example of a method of power-oriented, acceleration-dependent gear shifting according to the invention.

FIG. 6b is a diagram showing Vehicle Acceleration (a) vs. Output Speed ($n_2$) illustrating an example of a method of consumption-oriented, acceleration-dependent gear shifting according to the invention.

FIG. 7 is a two-part diagram showing in an upper diagram, Engine Speed ($n_1$) vs. Output Speed ($n_2$) and in a lower diagram, Vehicle Acceleration (a) vs. Output Speed ($n_2$), illustrating another embodiment of a method of consumption-oriented (consumption-optimized), acceleration-dependent gear shifting according to the invention.

FIG. 9b is a diagram showing Vehicle Acceleration (a) vs. Output Speed ($n_2$), further illustrating the acceleration-dependent downshift method shown in FIG. 9a.

DETAILED DESCRIPTION OF THE INVENTION

Figure 5A:
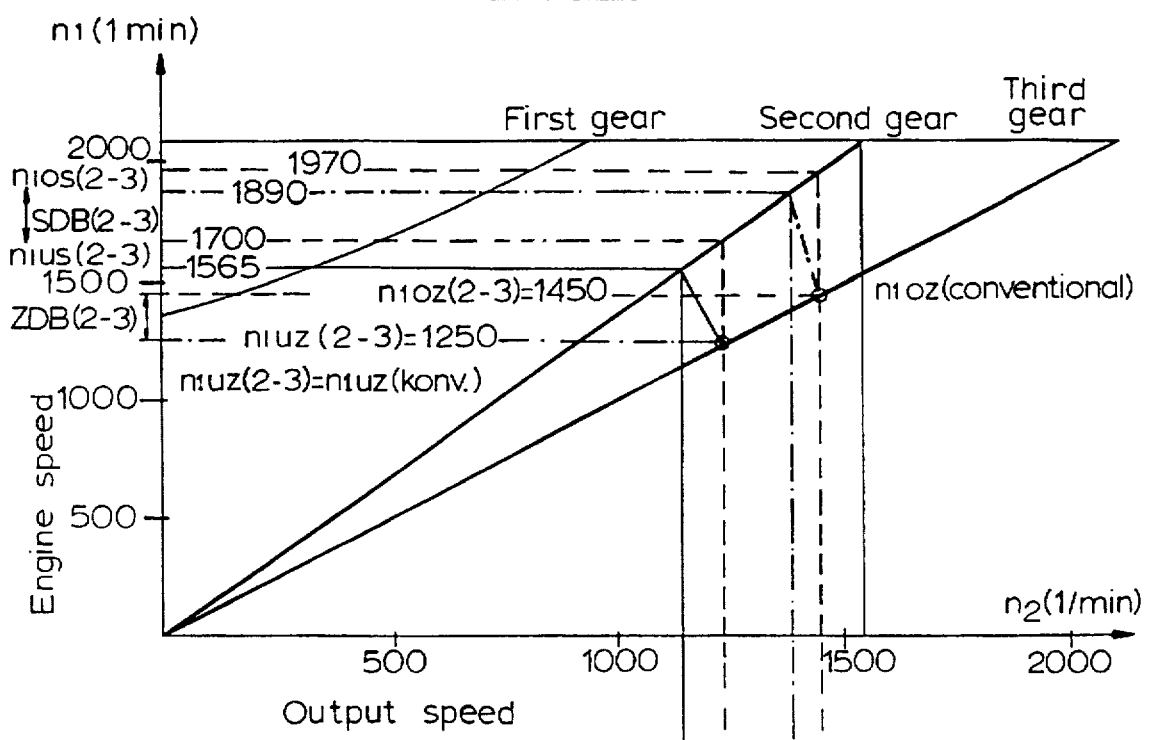
FIG. 5a is a diagram showing Engine Speed ($n_1$) vs. Output Speed ($n_2$) illustrating an example of a method of gear shifting from second to third gear according to the invention with a conventional (i.e., fixed gear shift points) acceleration-dependent gear shifting method from second to third gear.

An explanation of some of the terms used herein may be helpful here:

"Achieved speed" is understood to mean the input or engine speed achieved in the next, i.e., target gear after a gear shift.

"Gear shift speed" is the actual engine speed in a gear at which gear shifting to the next higher or next lower gear occurs.

The smallest possible and largest possible gear shift speeds are referred to as "limiting speeds."

"Gear shift speed range" is the speed range formed by the limiting speeds of a gear from which shifting is initiated.

The "target speed" is the engine or input speed achieved during shifting at a number of gear shift speeds.

The "target speed range" is the engine or input speed range in the target gear limited by the target speeds.

The subscript "conventional" characterizes shifting methods with fixed gear shift points.

Shifting is acceleration-independent according to the invention. According to requirements or driving, resistance shifting occurs at higher or lower input or engine speeds, depending on whether lower fuel consumption or sufficient acceleration is preferred. Acceleration of the vehicle or its deceleration is decisive for shifting itself. The following two limiting states or acceleration are always considered:

(a) Limited vehicle occupancy in flat or downhill terrain equals (=) high vehicle acceleration; and (b) High vehicle occupancy in uphill terrain equals (=) low vehicle acceleration.

In the first case (a), high vehicle acceleration is obtained at a low input speed. Upshifting of gears can therefore occur prematurely at a relatively low engine speed, which leads to a reduction in fuel consumption. For the same reason, downshifting of gears also occurs at lower deceleration with lower engine speeds. In the second case (b), greater engine power is required, for which reason upshifting only occurs at a relatively high engine speed. Depending on the measured vehicle acceleration or deceleration, upshifting or downshifting of gears occurs between these two driving conditions smoothly, i.e., in a gear shift speed range. The gear shift speed range itself also is dependent on the load range; at higher load, shifting also occurs at higher speed as a result.

Two basic concepts are implemented according to methods and devices of the invention:

(1) The stipulation of a gear shift speed range so that at least one target speed is achieved in the target gear; and (2) During stipulation of at least two target speeds—a lower and upper target speed—a graduated characteristic trend in the acceleration/output speed diagram.

In the first case (1), a gear shift speed range is prescribed in the initial gear in which shifting occurs into the target gear so that only a certain engine or input speed, the so-called target speed, is always reached in the presence of an acceleration component. However, this is only possible for small gear shift speed ranges. This configuration is therefore only a subvariant of case (2).

In the second case (2), the two limiting states (low vehicle occupancy on flat or downhill terrain and high vehicle occupancy in uphill terrain) are considered, i.e., high acceleration and low acceleration.

At high acceleration, the gear shift process is introduced at lower gear shift speeds, i.e., earlier, than in a conventional gear shift program with fixed gear shift points under the condition that the same target speeds are to be achieved in the target gear. Otherwise, i.e., on initiation of the gear shift process at the same gear shift speed, a shift in the achieved target speed occurs to higher input or engine speeds. At low acceleration and high required power, the gear shift into the next higher gear occurs at higher input or engine speeds, but at speeds that are lower than in a conventional gear shift process with respect to the achieved target speed. The target speeds to be set then preferably correspond to the conventionally achieved speeds in a conventional gear shift process without considering acceleration.

The two target speeds determine a so-called target speed range. Between these two states, gear shifting occurs smoothly as a function of acceleration. A graduated characteristic curve is obtained in the acceleration/output speed diagram.

The target speeds and the corresponding gear shift speeds can be free from the outset with consideration of the critical engine speeds in the target and starting gear, depending on whether gear shifting occurs to the next higher or next lower gear. However, the speeds achieved in a conventional gear shift process with fixed gear shift points also can be established as target speeds.

But a graduated characteristic curve also can be implemented with only one lower target speed and an additional upper attainable speed in the target gear. The upper attainable speed in the target gear is only achieved during gear shifting at a gear shift speed, whereas the lower target speed is achieved in gear shifting processes that are initiated at a number of different gear shift speeds.

A gear shift speed range is established according to the invention. The entire gear shift speed range theoretically available for gear shifting processes into the next higher or next lower gear is always obtained from the lowest critical engine speed and the maximum engine speed—the so-called limiting speeds. During high positive acceleration, earlier shifting occurs with consideration of the lowest critical engine speed, especially the input or engine speed to be achieved in the target gear during upshifting, or at high negative acceleration with consideration of the input or engine speed in the initial gear during downshifting. The driving properties can be better adapted with consideration of weight, axle-drive ratio and engine torque. Gear shifting occurs at high speeds during low acceleration. In conventional driving programs with fixed gear shift points, upshifting or downshifting occurs between gears at stipulated gear shift speeds. In the output speed/input speed diagram this means different target speeds, depending on driving resistance, i.e., according to acceleration during the gear shift process. In the extreme case, a target speed is obtained at equivalent output speed divided by the gear jump, otherwise higher target speeds. In the acceleration-dependent gear shift process according to the invention, the possible gear shift speed range is enlarged to the extent that gear shifting can occur at high acceleration during upshifting, at a lower gear shift speed relative to a conventional gear shift process as a function of acceleration of the vehicle, but a preestablished target speed is present after the gear shift process. In other words, gear shifting during upshifting occurs at higher vehicle acceleration at lower engine speeds than in a conventional gear shift program with fixed gear shift points; the gear shift processes, however, can be laid out and initiated with respect to gear sift speed and acceleration so that the same speeds are always achieved in the target gear without an influence on acceleration in gear shift processes with engine speeds that are smaller than the smallest possible speed during a conventional gear shift. The gear shift range is established as a function of acceleration of the vehicle and load so that at least one target speed is achieved. This can lie in the region of the lowest critical speed in the target gear, but must not go below this. In considering both limiting states, the gear shift range is established so that a speed between the two target speeds is always achieved.

Moreover, there is a possibility of varying the acceleration-independent gear shift process further by: (a) consumption-oriented; and (b) power-oriented acceleration-dependent gear shift methods. In the normal acceleration-dependent gear shift method, upshifting and downshifting are initiated with the entire possible gear shift speed range relative to the other programs. In a consumption-oriented, acceleration-dependent gear shift version, the gear shift speeds are low with reference to the total theoretically possible gear shift speed range for fuel consumption reasons. The gear shift speed range is therefore set relatively low and shifted to low input or engine speeds. In contrast, the gear shift speeds in a power-oriented, acceleration-dependent gear shift method are relatively high with reference to the total, theoretically possible gear shift speed range.

Acceleration-dependent shifting between individual gears offers the advantage of operating the vehicle according to the given conditions in fuel-oriented fashion or, if necessary, also in power-oriented fashion. Fuel consumption can be substantially reduced relative to a conventional gear shift program with fixed gear shift points.

By stipulating at least one target speed, i.e., choosing the gear shift speed in the gear shift process so that after completion of gear shifting, regardless of vehicle acceleration, a stipulated engine speed is achieved, falling short of a critical engine speed can be avoided, which can lead to vehicle bucking because of torque fluctuations of the engine. Moreover, with limitation of the gear shift speed range there is a possibility of rapid adjustment to the requirements of the customer (power-oriented or consumption-oriented driving), as well as long-distance or stop-and-go-dependent adjustment during operation. For example, it is not necessary that very high gear shift speeds also must be used in a loaded vehicle on level topography. With a limitation of gear shift speed range, gear shifting can already occur at reduced acceleration at lower gear shift speeds relative to a normal acceleration-dependent driving program.

By analogy to this, downshifting also occurs in deceleration-dependent fashion. This offers the advantage that early downshifting during high deceleration permits a continuous speed trend. An upshift and downshift limitation is additionally prescribed. This offers the advantage that upshifting can only occur during acceleration and downshifting only during deceleration, so that undesired upshifting can be avoided, for example, on releasing the gas pedal before a curve.

The design conversion can be implemented in a control device. This has at least one control unit with at least three inputs, a first input for a signal that describes acceleration of the vehicle; a second input coupled to the drive engine and intended to receive a signal that describes the present load range and a third input that is coupled to a device to determine the present engine speed. Moreover, at least one output is provided at which a control signal is released for the gear shift process, depending on the input quantities. Either a performance characteristic or a number of characteristic curves are entered in the control device itself, by means of which the control quantity is formed as a function of the input quantities.

There is a possibility of equipping each transmission according to the use requirements of the customer with a specified gear shift control or gear shift device, i.e., either the normal acceleration-dependent, the consumption-oriented, acceleration-dependent or the power-oriented, acceleration-dependent gear shift control or a gear shift device with the corresponding requirements. In the first case, the characteristic curves or performance characteristics are entered for a large gear shift speed range in the individual gears. Preferably, the entire theoretically possible gear shift speed range is considered, i.e., the lowest critical input or engine speed and the maximum possible input or engine speed of each gear. In the two other cases, performance characteristics and characteristic curves are only retrievably stored for smaller, limited gear shift speed ranges relative to the theoretically possible ones. This type of variant is characterized by relatively limited control expenditure. Only the characteristic curves for the corresponding driving states need be stored in the control device.

It is also possible according to the invention to change the gear shift speed ranges for a consumption-oriented and power-oriented method of driving via a factor from the entire theoretically possible gear shift speed range in normal acceleration-dependent gear shift programs.

Another embodiment of the invention consists in the fact that driving behavior can be actively adjusted to use requirements in which, for example, the driver is given the possibility of influencing initiation of the gear shift processes according to changing boundary conditions (for example, alternating driving in rough topography and on level ground over longer stretches). It is then at the driver's discretion to chose appropriate gear shift control via additional operating units, which act on driving behavior and fuel consumption. The control expenditure and amount of available information, however, are increased significantly. A cost-benefit analysis according to use requirements therefore appears reasonable.

Figure 5B:
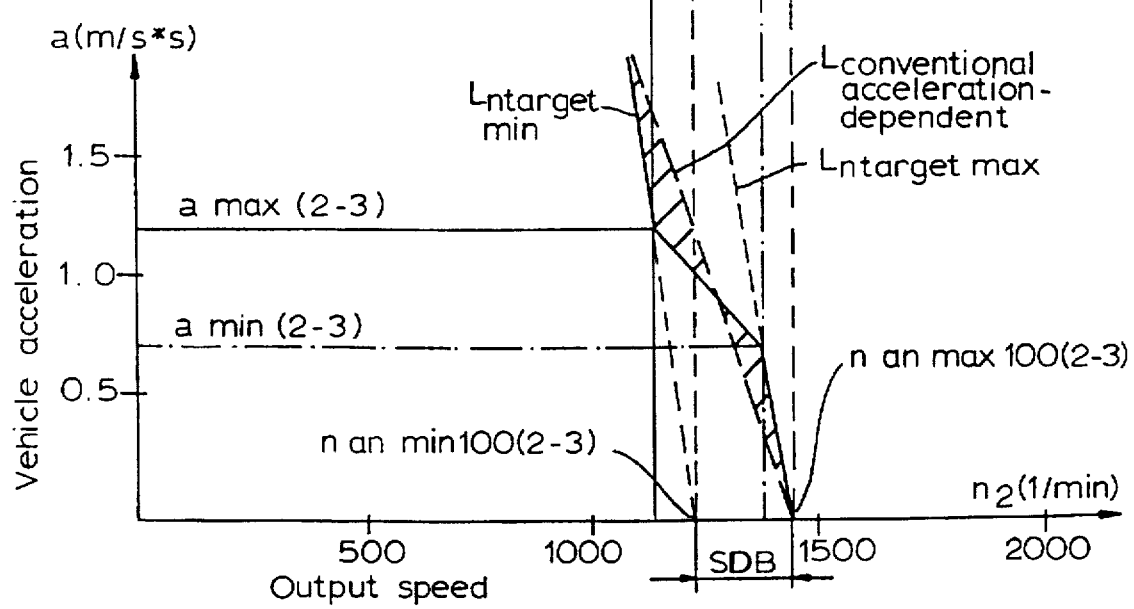
FIG. 5b is a diagram showing Vehicle Acceleration (a) vs. Output Speed ($n_2$) illustrating an example of a method of gear shifting from second to third gear according to the invention with a conventional (i.e., fixed gear shift points) acceleration-dependent gear shifting method from second to third gear.
Figure 8:
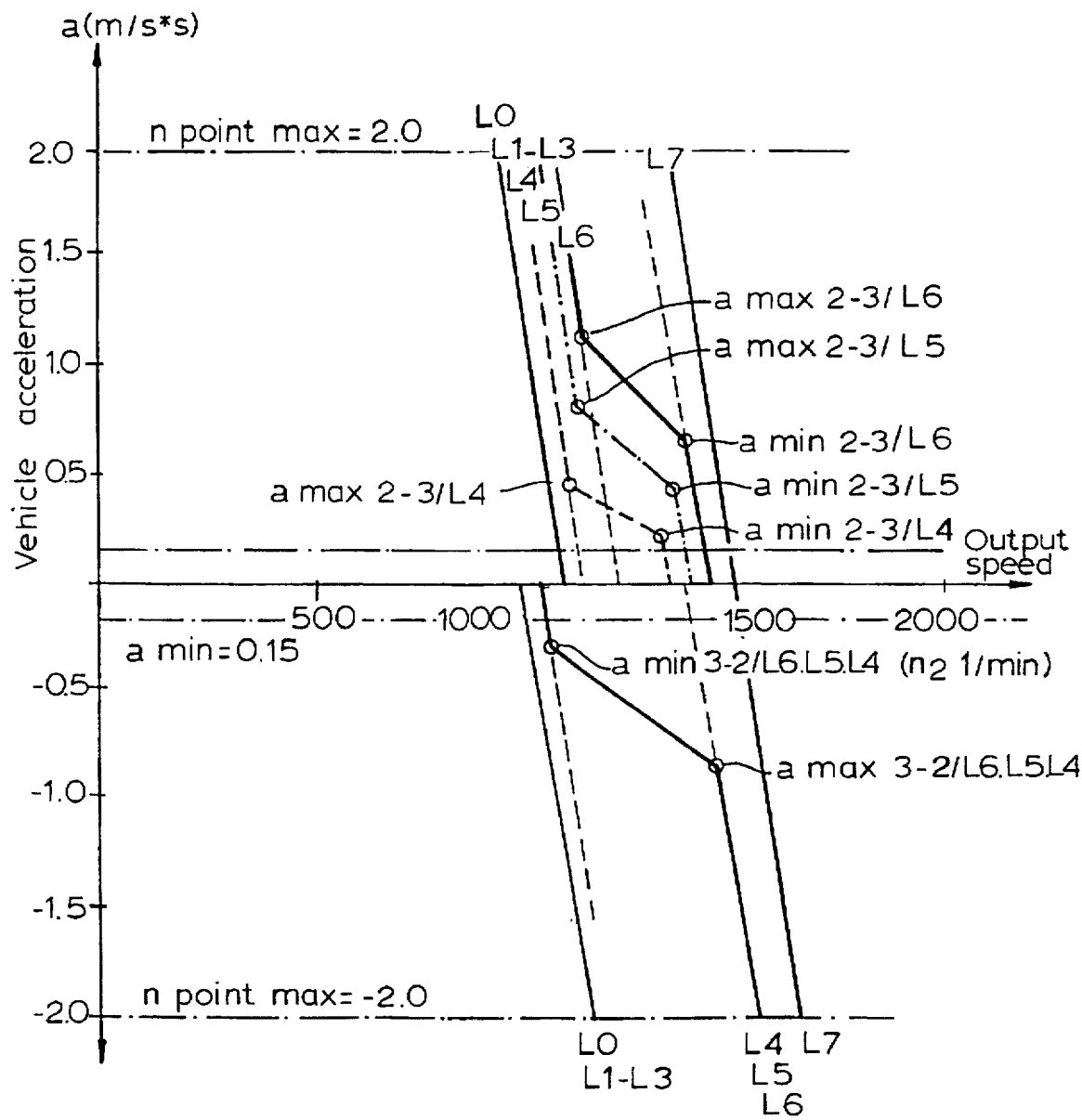
FIG. 8 is a diagram showing Vehicle Acceleration (a) vs. Output Speed ($n_2$), illustrating an acceleration-dependent gear shift methods of different load ranges according to the invention.
Figure 9A:
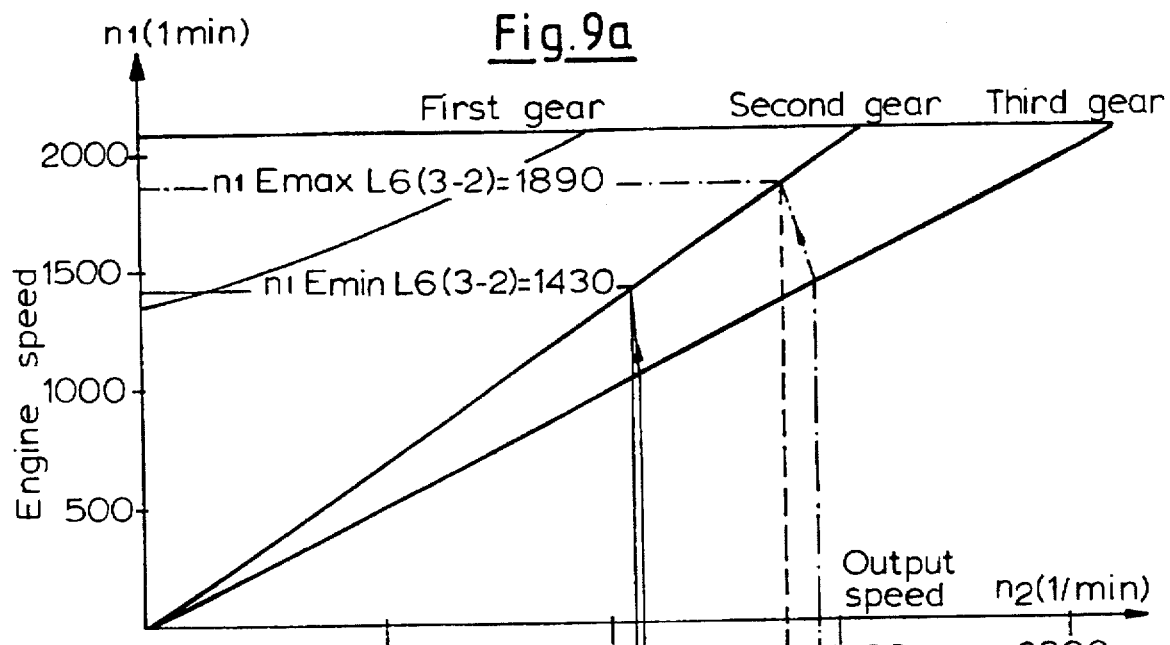
FIG. 9a is a diagram showing Engine Speed ($n_1$) vs. Output Speed ($n_2$) illustrating an acceleration-dependent downshift method according to the invention.
Figure 9B:
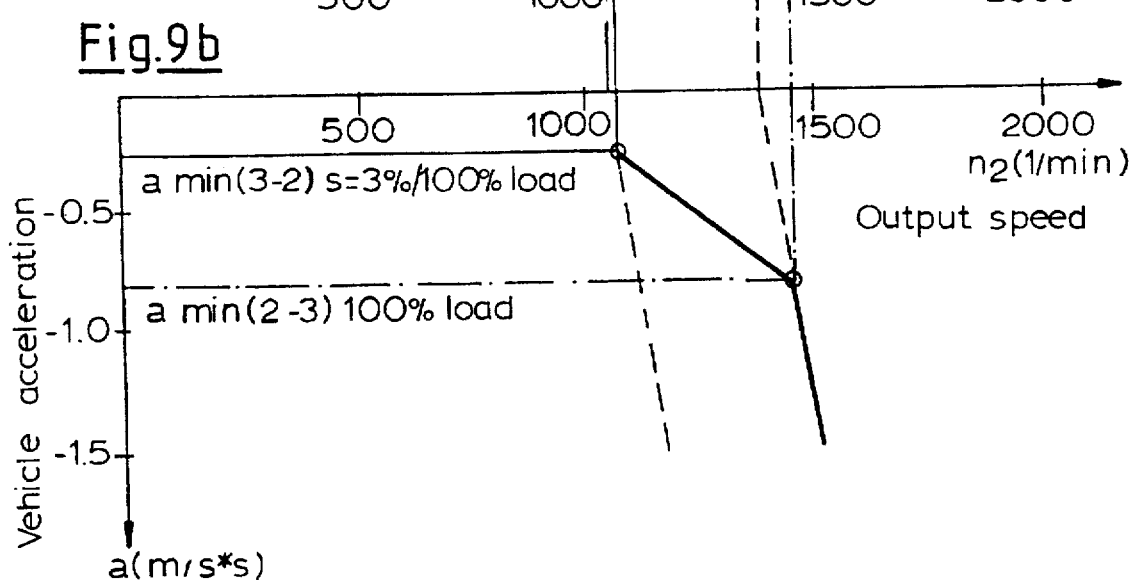
Figure 10:
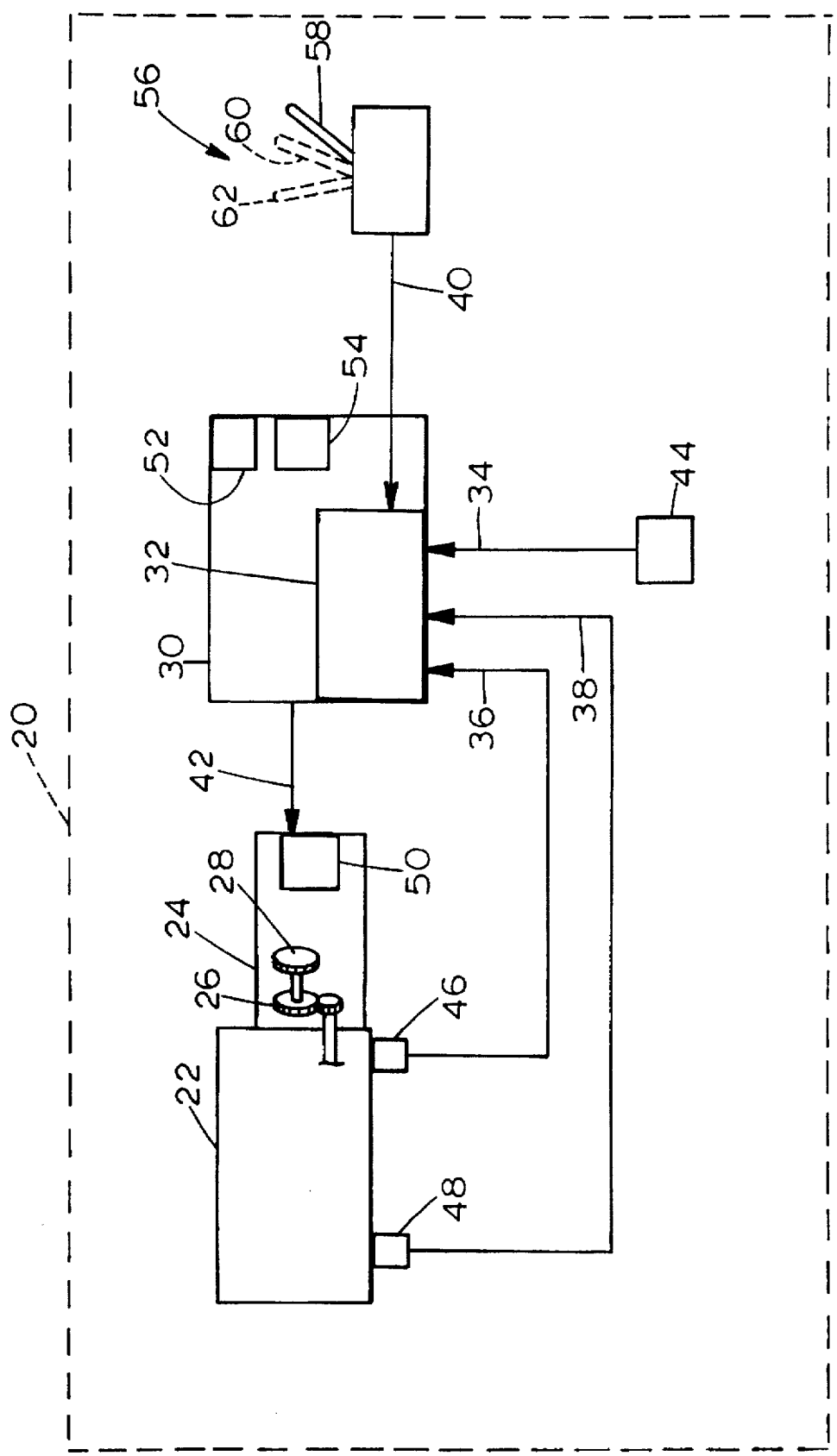
FIG. 10 is a diagram schematically showing a vehicle drive unit according to the invention.

The invention is further explained with reference to the figures. FIG. 1 schematically depicts the fundamental principle of the acceleration-dependent gear shift method according to the invention with reference to output speed/acceleration diagrams. FIGS. 2a, 2b, and 2c show a comparison concerning the gear shift speed range available between normal acceleration-dependent gear shift methods and the consumption- or power-oriented, acceleration-dependent gear shift methods of the invention. FIGS. 3a and 3b shows a conventional gear shift method for clarification. FIG. 4 shows the relation of fuel consumption and torque to input speed in one gear with reference to a section from an engine performance characteristic. FIGS. 5a and 5b show the characteristic curves of a normal acceleration-dependent gear shift program with reference to an example. FIGS. 6a and 6b show characteristic curves from the output speed/acceleration diagram of a consumption-oriented and a power-oriented, acceleration-dependent gear shift method of the invention. FIG. 7 shows the characteristic curve of a consumption-optimized, acceleration-dependent gear shift method of the invention in an output speed/acceleration diagram. FIG. 8 shows characteristic curves of acceleration-dependent gear shift methods of different load ranges. FIGS. 9a and 9b show an acceleration-dependent downshift process of the invention with reference to a characteristic curve. FIG. 10 is a diagram that schematically shows a vehicle drive unit according to the invention.

FIG. 1 schematically depicts in general the basic principle of an acceleration-dependent gear shift program according to the invention. For clarification, FIG. 1 includes two diagrams. Vehicle acceleration a has been plotted versus vehicle speed v, which is proportional to output speed $n_2$, and the engine speed, or input speed $n_1$, is plotted versus vehicle speed v for the individual gear shift processes from first to second gear, as well as from second to third gear. In each case two limiting states or accelerations are considered:

1. Driving with limited vehicle occupancy on level or downhill terrain yields adequate vehicle acceleration even at low engine speeds $n_1$. Upshifting then occurs prematurely at relatively low engine speed $n_1$, which generally leads to a reduction in fuel consumption.

2. Moreover, at high vehicle occupancy or uphill terrain, greater engine power is required. Upshifting therefore occurs only at a relatively high engine speed.

Upshifting or downshifting of gears between these two driving states occurs smoothly, depending on the measured vehicle acceleration or deceleration, i.e., in a so-called gear shift speed range, denoted SDB in the diagram. The designation $SDB_{(1-2)}$ corresponds to the gear shift speed range for gear shifting from first to second gear and the designation $SDB_{(2-3)}$ corresponds to the gear shift speed range referred to input or engine speed during gear shifting from second to third gear.

The gear shift speed range SDB also is dependent on the corresponding load range. At greater load, shifting generally also occurs at higher gear shift speed so that a higher engine or input speed also occurs in the next gear. The gear shift speed ranges $SDB_{(1-2)}$ and $SDB_{(2-3)}$ are bounded in each case by a lower gear shift speed $n_{1us(1-2)}$ or $n_{1us(2-3)}$ during gear shifting from first to second gear or from second to third gear and by an upper gear shift speed $n_{1os(1-2)}$ or $n_{1os(2-3)}$ during gear shifting from first to second and from second to third gear. The lowest gear shift speed $n_{1us(1-2)}$ or $n_{1us(2-3)}$ is determined from the lowest critical input or engine speed $n_1$ in the target gear. This avoids vehicle zooming or bucking by torque fluctuations from falling short of this critical engine speed.

A target speed range $ZDB_{(1-2)}$ or $ZDB_{(2-3)}$ in the target gear is assigned to each gear shift speed range $SDB_{(1-2)}$ and $SDB_{(2-3)}$. The target speed ranges are bounded by the smallest target speed $n_{1uz(1-2)}$ or $n_{1uz(2-3)}$ and a highest target speed $n_{1oz(1-2)}$ or $n_{1oz(2-3)}$. The lowest target speeds in the individual gears are bounded during upshifting by the lowest critical input or engine speed. During downshifting, the critical engine speed is the criterion for establishing the lowest gear shift speed in the initial gear.

It is also possible to further vary this normal acceleration-dependent gear shifting shown in FIG. 1. This can occur by: (a) consumption-oriented; and (b) power-oriented acceleration-dependent gear shift methods. These possibilities are shown in FIGS. 2b and 2c.

FIG. 2a explains for comparison a characteristic curve for a normal acceleration-dependent gear shift method. Upshifting and downshifting occur in the entire possible gear shift speed range SDB. This corresponds either to the gear shift speed range $SDB_{(1-2)}$ or $SDB_{(2-3)}$ in FIG. 1.

FIG. 2b explains relative to FIG. 2a a consumption-oriented, acceleration-dependent program. The gear shift speeds here are relatively low for fuel consumption reasons. This means that the gear shift speed range SDB relative to a normal acceleration-dependent gear shift program as shown in FIG. 2a is set relatively low. In the extreme case of the consumption-optimized variant, the acceleration function is then a relatively steeply descending line, which is shown here in the form of a dotted line $L_{consumption-optimized}$ with a correspondingly small gear shift speed range $SDB_{consumption-optimized}$ and at relatively low speed.

In contrast, in a power-oriented, acceleration-dependent gear shift program, as shown in FIG. 2c, the gear shift speeds with reference to a normal acceleration-dependent gear shift program are relatively high. In the power-optimized variant, the acceleration function is also a line $L_{power-optimized}$, which in the depicted case is shown as a dotted line. The gear shift speed range $SDB_{power-optimized}$ is then relatively small and is shifted to relatively high speeds.

For comparison, FIGS. 3a and 3b show in two diagrams the characteristic curve for a conventional gear shift process with fixed gear shift points for a shifting process for the extreme case without acceleration effects. In the diagrams, the vehicle acceleration a is plotted versus vehicle speed v, which is proportional to output speed $n_2$, and the engine speed or input speed $n_1$ is plotted versus vehicle speed v for a gear shift process. In a conventional gear shift process this occurs, for example, at a gear shift speed $n_{1s(conventional)}$. With this extreme case without an acceleration effect, an input or engine speed is achieved in third gear as target speed $n_{1z(conventional)acceleration-independent}$. The characteristic curve $L_{conventional-acceleration-independent}$ stands for this gear shift process in the acceleration/output speed diagram. However, since an empty vehicle running downhill can experience an acceleration because of physical conditions during a gear shift process, with the initiated gear shift process at $n_{1s(conventional)}$ in the target gear $n_{1z(conventional)acceleration-independent}$ could not be established, but rather a higher input and thus also output speed, in this example $n_{1z(conventional)simple\ acceleration-dependent}$.

In the subsequent figures, acceleration-dependent gear shifting according to the invention, with different possible variations, is explained with reference to an example.

FIG. 4 shows in general the engine torque trend $M_{mot}$ (i.e., $M_{engine}$) versus input speed of the engine $n_1$ and the corresponding fuel consumption (be) for the working or gear shift range in second gear with reference to gear shifting from second to third gear. This working or gear shift range is designated here as a gear shift speed range $SDB_{(2-3)}$. The lowest speed $n_1$ at which a gear shift into third gear can occur in second gear is designated $n_{1us(2-3)}$. The highest speed at which a gear shift from second to third gear can occur is designated $n_{1os(2-3)}$. These two speeds bound the gear shift speed range $SDB_{(2-3)}$. It is apparent from this diagram that limited fuel consumption, as well as high engine torque, are noted in second gear at low speed. In contrast, for the highest possible gear shift speed in second gear $n_{1os(2-3)}$, the highest fuel consumption applies at low engine torque.

FIGS. 5a and 5b show an example for a normal acceleration-dependent version of an acceleration-dependent gear shift process for gear shifting from second to third gear with reference to the two diagrams in which the input speed $n_1$ is plotted versus output speed $n_2$ and the acceleration a versus output speed $n_2$. The numbers shown in the diagram serve only for explanation.

During a conventional gear shift, the lowest possible gear shift speed $n_{1us(conventional)}$ in second gear is, say, 1700 rpm, with which an input or engine speed as target speed $n_{1uz(conventional)}$ of 1250 min$^{-1}$ is achieved in third gear without an acceleration effect. However, owing to consideration of a possible acceleration component initiation of the gear shift process can occur much sooner, i.e., at lower gear shift speeds $n_{1s(2-3)}$, for example, at the lowest gear shift speed $n_{1us(2-3)}$ of 1565 rpm. Nevertheless, in this example the input or engine speed $n_{1uz(2-3)}=n_{1uz(conventional)}$ of 1250 rpm is reached. This input or engine speed in third gear of 1250 rpm is reached during gear shifts with gear shift speeds in the gear shift speed partial range $n_{1us(2-3)}$ to $n_{1us(conventional)}$. The speed $n_{1uz(2-3)}$ is therefore also referred to as target speed $n_{minimal\ target}$. By analogy, these assertions can also be applied to the highest, i.e., greatest possible gear shift speed. The greatest possible gear shift speed in second gear in a conventional gear shift process lies at $n_{1os(conventional)}=1970$ rpm. After completion of gear shifting, the input or engine speed in third gear lies at $n_{1oz(convention)}=1450$ rpm.

However, in the acceleration-dependent gear shift according to the invention, during occurrence of an acceleration component, the gear shift process is initiated earlier as a function of the amount of acceleration, for example, at an engine speed $n_{1s(-3)}=1890$ rpm. Nevertheless, in third gear, the same input or engine speeds $n_{target}=n_{1oz(conventional)}=n_{maximal\ target}=1450$ rpm are achieved. At acceleration $a=0$ m·s$^{-2}$, the gear shift occurs from second to third gear at $n_{1s(2-3)}=n_{1os(conventional)}$, for which reason this gear shift speed is designated $n_{1os(2-3)}$ for the acceleration-dependent gear shift from second to third gear.

The gear shift speed range for gear shifting from second to third gear $SDB_{(2-3)}$ is bounded, for example, by the speeds $n_{1us(2-3)}$ and $n_{1os(2-3)}$. Establishment of the gear shift speeds occurs according to the invention in this gear shift speed range so that after completion of the gear shift process, i.e., in third gear, an input speed $n_{1z}$ is achieved in the target speed range $ZDB_{(2-3)}$ from $n_{1uz(2-3)}$ to $n_{1oz(2-3)}$ and a lowest critical input or engine speed in the target gear is not fallen short of during upshifting.

A lower engine or input speed is achieved by early gear shifting at high acceleration. It is decisive that during each acceleration, the gear shift process is initiated as a function of the two considered limiting states at an input or engine speed, i.e., gear shift speed $n_{1s}$ in the initial gear at which a speed (the target speed $n_{1z}$) is always achieved in the target speed range in the next gear. Thus, in shifting from second to third gear, an acceleration component is utilized that results in a higher engine or input speed in the next gear (here third gear), in contrast to the conventional gear shift process with stipulated gear shift points. Considering the acceleration component, the gear shift speed range $SDB_{(2-3)}$ during the gear shift process from second to third gear can be expanded to lower input or engine speeds relative to the conventional gear shift process.

The target speeds $n_{1uz(2-3)}$ and $n_{1oz(2-3)}$, which theoretically can be the minimal and maximal target speeds $n_{minimal\ target}$ and $n_{maximal\ target}$, determine the target speed range $ZDB_{(2-3)}$. The minimal and maximal target speeds $n_{minimal\ target}$ and $n_{maximal\ target}$ determine the theoretically possible target speed range $ZDB_{(2-3)th}$. Its size is generally established according to the achieved target speeds in the target gear during a gear shift process without consideration of acceleration. In the case presented in FIGS. 5a and 5b, this means that during a shift from second gear to third gear at an engine or input speed $n_{1us(2-3)}=1565$ rpm and an overlying input speed of $n_{1s(2-3)}<n_{1s(conventional)}$ (for example $n_{1s(2-3)}=1600$ rpm) a speed of $n_{uz(2-3)}=n_{minimal\ target}$ is achieved in third gear.

Shifting to second gear then occurs in an empty vehicle at maximum acceleration with the lower limiting speed $n_{1us(2-3)}$, whereas at 100% load, for example, and minimal acceleration, shifting is initiated at very high speeds in the gear shift speed range $SDB_{(2-3)}$, but at a gear shift speed $n_{1s(2-3)}<n_{1os(conventional)}=n_{1os(2-3)}$.

FIG. 5b shows the resulting acceleration/output speed characteristic curves for the target speeds of both limiting states: (1) empty vehicle and high acceleration; and (2) vehicle with, for example, 100% load and low acceleration in the acceleration/output speed diagram as dashed lines $n_{minimal\ target}$ and $n_{maximal\ target}$. The connection between the two characteristic curves at the points of maximal and minimal acceleration in the plane $a_{max(2-3)}$ and $a_{min(2-3)}$ reflects the effect of acceleration and leads to a graduated characteristic curve trend for acceleration during shifting from second to third gear. For a maximal acceleration $a_{max(2-3)}$ in an empty vehicle, a gear shift speed of $n_{1us(2-3)}$ is established. A minimal acceleration $a_{min(2-3)}$ at a load of, say, 100% corresponds to a gear shift speed in the range of $n_{1os(2-3)}$.

The characteristic curves shown in FIG. 5b apply only to a load state. According to the position of the power control element of the drive engine, for example, the throttle valve position, however, different load states are obtained that also must be considered during gear shifting or in stipulating the gear shift speed range.

There is a possibility of establishing the target speed range, i.e., the achieved speeds, i.e., the input or engine speed $n_{1target}$ present after the gear shift process in the next gear in the theoretically possible range between $n_{1zmin}$ and $n_{1zmax}$ as a function of engine torque: (1) stepless; or (2) coordinated with the load range. In the second case, depending on the number of load ranges, an equal number of stipulatable target speed ranges and gear shift speed ranges coordinated with them are obtained, which can differ from each other in magnitude.

The dot-dash line in FIG. 5 shows the known characteristic curve $L_{conventional-simple\ acceleration-dependent}$ for a conventional simple acceleration-dependent gear shift. In an empty vehicle at maximum acceleration, the gear shift process in second gear occurs at a gear shift speed of $n_{1us(conventional)}$, but at minimal acceleration and, for example, 100% load, at a gear shift speed $n_{1os(conventional)}$. The shaded area shows the deviations of the two characteristic curves. It is apparent that according to the invention, at high acceleration, the gear shift process occurs with lower speed relative to the known conventional characteristic curve $L_{conventional-simple\ acceleration-dependent}$, whereas at minimal acceleration and high load of the vehicle, the gear shift process occurs at higher speeds.

A comparison between a power-oriented and a consumption-oriented gear shift process is made in FIGS. 6a and 6b for clarification. For this purpose the output speed/acceleration diagrams are shown for the two cases. Comparison occurs relative to the normal acceleration-dependent gear shift process, as described in FIGS. 5a and 5b.

FIG. 6a then explains the possibility of a power-oriented, acceleration-dependent gear shift process. In this case, the gear shift speed range for shifting from second to third gear $SDB_{(2-3)power-oriented}$ is reduced relative to engine speed or input speed $n_1$ at higher speeds. The same holds by analogy for the target speed range ZDB. In contrast to the normal acceleration-dependent gear shift process shown in FIG. 4, this means a reduction in gear shift speed range in the direction of the upper gear shift speed $n_{1os(2-3)}$; the lower gear shift speed during power-oriented shifting $n_{1us(2-3)power-oriented}$ is consequently much greater than the lower gear shift speed $n_{1us(2-3)}$ during normal acceleration-dependent shifting. As a result, shifting occurs at high acceleration only at higher engine speeds than during normal acceleration-dependent methods.

The limiting values with reference to acceleration $a_{max(2-3)}$ in an empty vehicle and $a_{min(2-3)}$ at 100% load are plotted versus output speeds $n_2$ during shifting from second to third gear in the diagram of FIG. 6a. Relative to the normal acceleration-dependent process according to FIG. 5b, for which the target speed characteristic curves $n_{1uz(2-3)}$ and $n_{1oz(2-3)}$ of the limiting states at $a_{max(2-3)}$ in an empty vehicle and $a_{min(2-3)}$ at 100% load are shown by means of dashed lines, this shows that at maximum acceleration in an empty vehicle, the shifting process first occurs at higher input speeds in second gear.

The diagram in FIG. 6a therefore shows that relative to normal acceleration-dependent gear shift versions, as shown in FIGS. 5a and 5b, a reduction in the gear shift speed range and a shift in gear shift speeds to higher input speeds occur.

In contrast, during a consumption-oriented shifting version according to FIG. 6b, the reduction occurs in the favor of smaller input speeds with reference to the gear shift speed range of FIG. 5.

The regions for power- or consumption-oriented gear shift processes can be determined, for example, by means of a factor from the total theoretically possible gear shift speed range. The technical conversion is then at the discretion of one skilled in the art.

FIG. 7 shows a modification of the normal acceleration-dependent, consumption-oriented version according to FIG. 6b for shifting from second to third gear in a consumption-optimized version. The basic requirements are the same, but the working range $SDB_{(2-3)consumption-optimized}$ relative to the consumption-oriented version $SDB_{consumption-oriented}$ is reduced even further. The stipulation of only a single target speed $n_{target-consumption-optimized}$ is also significant for a consumption-optimized shifting.

Shifting into second gear then occurs at very high acceleration in the region of the lower gear shift speed of the gear shift speed range $n_{1us(2-3)consumption-optimized}$ and at lower acceleration in the region of the upper limiting value $n_{1os(2-3)consumption-optimized}$ of the working range $SDB_{(2-3)consumption-optimized}$.

In this case (i.e., FIG. 7), the extreme case of the consumption-oriented version, the acceleration function is a relatively steeply descending line. This means that shifting to third gear occurs in a relatively small gear shift speed range in second gear and the acceleration values are correspondingly coordinated with the small speed range in second gear, which results in initiation of the gear shift process. The gear shift process from second to third gear then occurs at relatively low consumption values with reference to FIG. 4.

By analogy, power-optimized shifting is also possible for the extreme case (not shown here in detail) of power-oriented shifting.

Whereas thus far only the characteristic curves of individual load ranges have been shown, FIG. 8 shows the graduated characteristic curve trend for a normal acceleration-dependent shifting process for a number of individual load ranges L0 to L7. For these individual load ranges, a specific gear shift speed range is established in the initial gear (i.e., a working range) and also a target speed range in the target gear. These ranges shift to higher engine or input speeds with increasing load range. In similar fashion, the lowest critical gear shift speeds for the individual load ranges also shift to higher speed values in the target gear.

From the discussion herein, it also is apparent that downshifting is deceleration-dependent, as shown on the example of downshifting in load range L6.

Load range-dependent shifting is one possibility. Another consists of stepless, acceleration-dependent shifting. In the last-named case, however, because of the number of target speeds to be considered, the control costs are increased. The control device of the control unit must have complete performance characteristics that permit coordination between each engine power characteristic (torque and speed), actual acceleration and gear shift speed.

Generally, these gear shift controls or control devices are designed and laid out so that the customer acquires a vehicle with a gear shift control corresponding to his main areas of use. The transmission and its control are then laid out so that either normal acceleration-dependent or acceleration-dependent-power-oriented or acceleration-dependent-consumption-oriented driving is possible. Another conceivable variant consists of the fact that the driver can actively react to changing boundary conditions, for example, principal operation of the vehicle on level ground (preferably consumption-oriented driving method) or in very rough topography (preferably performance-oriented driving method), i.e., he himself has the possibility of choosing the required shifting method, for example, by an activation device in the form of a hand lever in the driver's compartment. Other preferred possibilities are also conceivable. In the latter case, however, the control expenditure is increased. The individual possibilities for design conversion of acceleration-dependent shifting control will not be taken up in detail here, since the possibilities for designing such devices are generally known.

FIGS. 9a and 9b clarify the possibility of acceleration-dependent downshifting.

As shown schematically in FIG. 10, an exemplary vehicle drive unit 20 according to the invention includes a drive engine 22, a transmission 24 having two gears 26 and 28, and a control device 30 connected to the transmission 24. The control device 30 has a control unit 32 having first, second, third, and fourth inputs 34, 36, 38, and 40, respectively, and an output 42. The first input 34 is connected to a measurement device 44 for determining a quantity that describes acceleration of the vehicle. The second input 36 is connected to a device 46 for determining torque of the drive engine 22. The third input 38 is connected to a device 48 for determining the speed of the drive engine 22. The output 42 is connected to a control unit 50 to accomplish a gear shift process in the transmission 24. The control unit 32 further includes a storage apparatus 52 for storing at least one characteristic curve in the control unit 32 for a gear shift speed range to characterize the relation between present acceleration, input speed, drive torque and gear shift speed and a control quantity forming apparatus 54 for forming control quantities from the input quantities.

An activation device in the form of a hand lever 56 is operatively connected to the control unit 32 via the fourth input 40 and is located in the driver's compartment (not shown) for selecting the required shifting method. The hand lever 56 may be moved to a first position 58, a second position 60, or a third position 62. Placement of the hand lever 56 in the first position 58 commands the control unit 32 to utilize the normal acceleration-dependent gear shift method. Placement of the hand lever 56 in the second position 60 commands the control unit 32 to utilize the consumption-oriented, acceleration-dependent gear shift method. Placement of the hand lever 56 in the in the third position 62 commands the control unit 32 to utilize the power-oriented, acceleration-dependent gear shift method.

The storage apparatus 52 is preferably capable of storing engine performance characteristics, as well as a characteristic curve for each load range and for at least two gear shift speed ranges. The control quantity forming apparatus 54 is preferably a routine programmed into the control device 30.

The foregoing detailed description is given for clearness of understanding only, and no unnecessary limitations should be understood therefrom, as modifications within the scope of the invention will be apparent to those skilled in the art.

We claim:

1. A method of operation of a drive unit of a vehicle having a drive engine and a transmission with at least two gears, the method comprising the following steps:
   a) continuously determining the following quantities:
      (i) a quantity characterizing acceleration of the vehicle; and
      (ii) quantities characterizing the power of the drive engine;
   b) for a gear shift process in an initial gear, establishing a gear shifting speed range and a second speed range bounded by a lowest and highest achievable speed of a target gear, the gear shift speed range being bounded at least by a lower gear shift speed and an upper gear shift speed, the second speed range being bounded by a lower target speed and an additional speed;
   c) initiating the gear shift process as a function of a determined acceleration;
   d) achieving the lower target speed during a shifting process in a first limiting state (high acceleration at low input speeds or limited deceleration at low input speeds) during introduction of shifting at a number of gear shift speeds; and
   e) introducing the gear shift process between the first limiting state and the highest attainable speed in the target gear as a function of the determined quantities in the gear shift speed range in the initial gear.

2. The method of claim 1 wherein the second speed range is a target speed range bounded by an upper target speed and further comprising the steps of:
   a) achieving the upper target speed in a gear shift process in a second limiting state (limited acceleration at high input speeds or high deceleration at high input speeds) during initiation of shifting at a number of gear shift speeds; and
   b) initiating the shifting process between the two limiting states as a function of the determined quantities in the gear shift speed range in the initial gear.

3. The method of claim 1 wherein the gear shift speed range in the initial gear is established so as to include an entire theoretically possible gear shift speed range, the gear shift speed range being bounded by a lowest critical input speed and a maximum possible input speed.

4. The method of claim 3 wherein the gear shift speed range is reduced in size relative to the theoretically possible gear shift speed range.

5. The method of claim 1 wherein the gear shift speed range is shifted to low input speeds.

6. The method of claim 1 wherein the gear shift speed range is shifted to higher input speeds.

7. The method of claim 5 wherein the gear shift speed range is established so that only a single target speed is achieved in the target gear in a shifting process, in the entire gear shift speed range.

8. The method of claim 6 wherein the gear shift speed range is established so that only a single target speed is achieved in the target gear in a shifting process, in the entire gear shift speed range.

9. The method of claim 4 wherein the gear shift speed range is changed by a factor from the total theoretically possible gear shift speed range.

10. A drive unit of a vehicle comprising:
    (a) a drive engine;
    (b) a transmission having at least two gears;
    (c) a control device connected to the transmission having a control unit having at least first, second, and third inputs and at least one output;
       (i) the first input being connected to a measurement device for determining a quantity that describes acceleration of the vehicle;
       (ii) the second input being connected to a device for determining torque of the drive engine;
       (iii) the third input being connected to a device for determining the speed of the drive engine;
       (iv) the output being connected to a control unit to accomplish a gear shift process in the transmission;
    (d) means for storing at least one characteristic curve in the control unit for a gear shift speed range to characterize the relation between present acceleration, input speed, drive torque and gear shift speed; and
    (e) means for forming control quantities from the input quantities.

11. The drive unit of claim 10 wherein the means of paragraph (e) are a routine programmed into the control device.

12. The drive unit of claim 10 further comprising means for storing a characteristic curve in the control device for each load range.

13. The drive unit of claim 10 further comprising means for storing a performance characteristic in the control device.

14. The drive unit of claim 10 comprising means for storing characteristic curves or performance characteristics in the control device for at least two gear shift speed ranges.

15. The drive unit of claim 14 further comprising an additional input in the control device connected to an activation device for selecting the gear shift speed ranges.

* * * * *